(12) United States Patent
Schachtely et al.

(10) Patent No.: US 7,831,704 B2
(45) Date of Patent: Nov. 9, 2010

(54) METHODS AND SYSTEMS FOR MONITORING AND DIAGNOSING MACHINERY

(75) Inventors: Alan Thomas Schachtely, Minden, NV (US); John Wesley Grant, Gardnerville, NV (US); Richard Lewis Gomer, Gardnerville, NV (US); Bradley Ted Kelly, Gardnerville, NV (US); Chad Eric Knodle, Dayton, NV (US); Patrick Louis Pfrehm, Carson City, NV (US); James Joseph Schmid, Kirkland, WA (US)

(73) Assignee: General Electric Company, Schenectady, NY (US)

( * ) Notice: Subject to any disclaimer, the term of this patent is extended or adjusted under 35 U.S.C. 154(b) by 1703 days.

(21) Appl. No.: 10/829,528

(22) Filed: Apr. 22, 2004

(65) Prior Publication Data

US 2005/0262236 A1 Nov. 24, 2005

(51) Int. Cl.
*G06F 15/173* (2006.01)
(52) U.S. Cl. .......................... 709/224; 700/51; 700/83; 700/103; 710/15; 717/136
(58) Field of Classification Search ................. 709/224; 700/103, 83, 51; 710/15; 717/136
See application file for complete search history.

(56) References Cited

U.S. PATENT DOCUMENTS

| 5,311,562 | A | 5/1994 | Palusamy et al. |
|---|---|---|---|
| 5,329,465 | A | 7/1994 | Arcella et al. |
| 5,905,989 | A | 5/1999 | Biggs |
| 6,026,348 | A | 2/2000 | Hala |
| 6,041,287 | A | 3/2000 | Dister et al. |
| 6,092,029 | A | 7/2000 | Bently |
| 6,298,308 | B1 | 10/2001 | Reid et al. |
| 6,405,139 | B1 | 6/2002 | Kicinski et al. |
| 6,421,571 | B1 | 7/2002 | Spriggs et al. |
| 6,507,804 | B1 | 1/2003 | Hala et al. |
| 6,633,782 | B1 | 10/2003 | Schleiss et al. |

(Continued)

OTHER PUBLICATIONS

FR Preliminary Search Report, App. No. 0503849 (Dec. 22, 2006).
GB Search Report, London; Reference 51EM136240/10634; Application No. GB0507905.8; Jul. 7, 2005 Date of Search; 1 pg.

*Primary Examiner*—Albert DeCady
*Assistant Examiner*—Tejal J Gami
(74) *Attorney, Agent, or Firm*—Armstrong Teasdale LLP (57) ABSTRACT

A method of managing a machinery monitoring system is provided. The machinery monitoring system includes a database of at least one rule set, the rule set including at least one rule expressed as a relational expression of a real-time data output relative to a real-time data input, the relational expression being specific to a plant asset. The method includes importing data representative of a rule set into the machinery monitoring system, applying the at least one rule set to a specific plant asset wherein the at least one rule set is configured to locate the data input using at least a portion of the relative path information, determining a data output of the at least one rule set using the at least one relational expression and the data input, and transmitting the data output to at least one of the machinery monitoring system and the plant monitoring and control system.

12 Claims, 5 Drawing Sheets

U.S. PATENT DOCUMENTS

| | | | |
|---|---|---|---|
| 6,647,745 B1 * | 11/2003 | Belanger | 62/656 |
| 2002/0032495 A1 * | 3/2002 | Ozaki | 700/108 |
| 2002/0032544 A1 | 3/2002 | Reid et al. | |
| 2002/0161940 A1 | 10/2002 | Eryurek et al. | |

* cited by examiner

METHODS AND SYSTEMS FOR MONITORING AND DIAGNOSING MACHINERY

BACKGROUND OF THE INVENTION

This invention relates generally to the monitoring of measured parameters, and more particularly to methods and systems for monitoring and diagnosing machinery.

At least some known monitoring systems, monitor machine drivers, for example, motors and turbines, or machine driven components, such as, pumps, compressors, and fans. Other known monitoring systems monitor process parameters of a process, for example, piping systems. Such monitoring systems may operate independent of or may be integrated through, a distributed control system (DCS). The DCS may permit a user to create various combinations of parameters to perform analysis functions. However, within known distributed control systems, these combinations and analysis functions are specific to the DCS platform they are executing on, and as such, generally are not usable to monitor a plurality of machines or on other DCS systems without significant editing of software code.

Creating and/or editing complex analysis functions may be a time-consuming process that requires considerable expertise. For example, an applications engineer may have the knowledge to use analysis functions to detect many types of machine conditions and malfunctions, but may not have the technical expertise needed to translate the knowledge into computer readable code. Additionally, the expertise of the applications engineer may have been acquired as the result of many years of training and experience in a wide variety of situations. This training and experience may be a valuable intellectual property resource to the applications engineer and his employer, intellectual property that the applications engineer and his employer would like to capture and market to customers. At least some known DCS only permit programming in environments that are only mildly protected from access. In such DCS, the intellectual property embodied in the programming of monitoring, analysis, and control functions of the DCS is not protected from unauthorized use and may be copied, edited, and used in other systems or for other machines on the same system. Moreover, using code that is applicable to one machine may require significant editing to allow its use for other machines being monitored by the DCS.

Typically, as more features and functionality are added to software applications, the complexity of configuring and setting properties that controls the execution of the application increases, especially in applications designed in a modular scheme. However, such configuration and property settings may only be available to the user through a confusing assortment of mechanisms, such as right-click menus and property pages buried within other property pages.

BRIEF DESCRIPTION OF THE INVENTION

In one aspect, a method of managing a machinery monitoring system is provided. The machinery monitoring system includes a database of at least one rule set, the rule set including at least one rule expressed as a relational expression of a real-time data output relative to a real-time data input, the relational expression being specific to a plant asset. The method includes importing data representative of a rule set into the machinery monitoring system wherein the data includes rule set full operand relative path information, applying the at least one rule set to a specific plant asset that is monitored by a plant monitoring and control system wherein the at least one rule set is configured to locate the data input using at least a portion of the full operand relative path information, determining a data output of the at least one rule set using the at least one relational expression and the data input, and transmitting the data output to at least one of the machinery monitoring system and the plant monitoring and control system.

In another aspect, a network based machinery monitoring system for a plant is provided. The system includes a client system including a user interface and a browser, a centralized database for storing rule sets, the rule sets including at least one rule expressed as a relational expression of a real-time data output relative to a real-time data input, the relational expression being specific to a plant asset, and a server system configured to be coupled to the client system and the database wherein the server system is further configured to enable a user to import the at least one rule set into the server system, the rule set including full operand relative path information, apply the imported rule set to a specific plant asset monitored by a plant monitoring and control system, the rule set configured to locate the data input using at least a portion of the full operand relative path information, determine the data output of the imported rule set using the at least one relational expression and the data input, and execute at least one of an event type and an actionable information text set.

In yet another aspect, a computer program embodied on a computer readable medium for managing a machinery monitoring system using a server system coupled to a client system and a database wherein the client system includes a user interface is provided. The program includes a code segment that prompts a user to select at least one rule set from a library of rule sets and then enables a user to import the selected at least one rule set into the server system, the rule set including full operand relative path information, applies the imported rule set to a specific plant asset monitored by a plant monitoring and control system, the rule set configured to locate the data input using at least a portion of the full operand relative path information, determines the data output of the imported rule set using the at least one relational expression and the data input, and executes at least one of an event type and an actionable information text set.

DETAILED DESCRIPTION OF THE INVENTION

Figure 1:
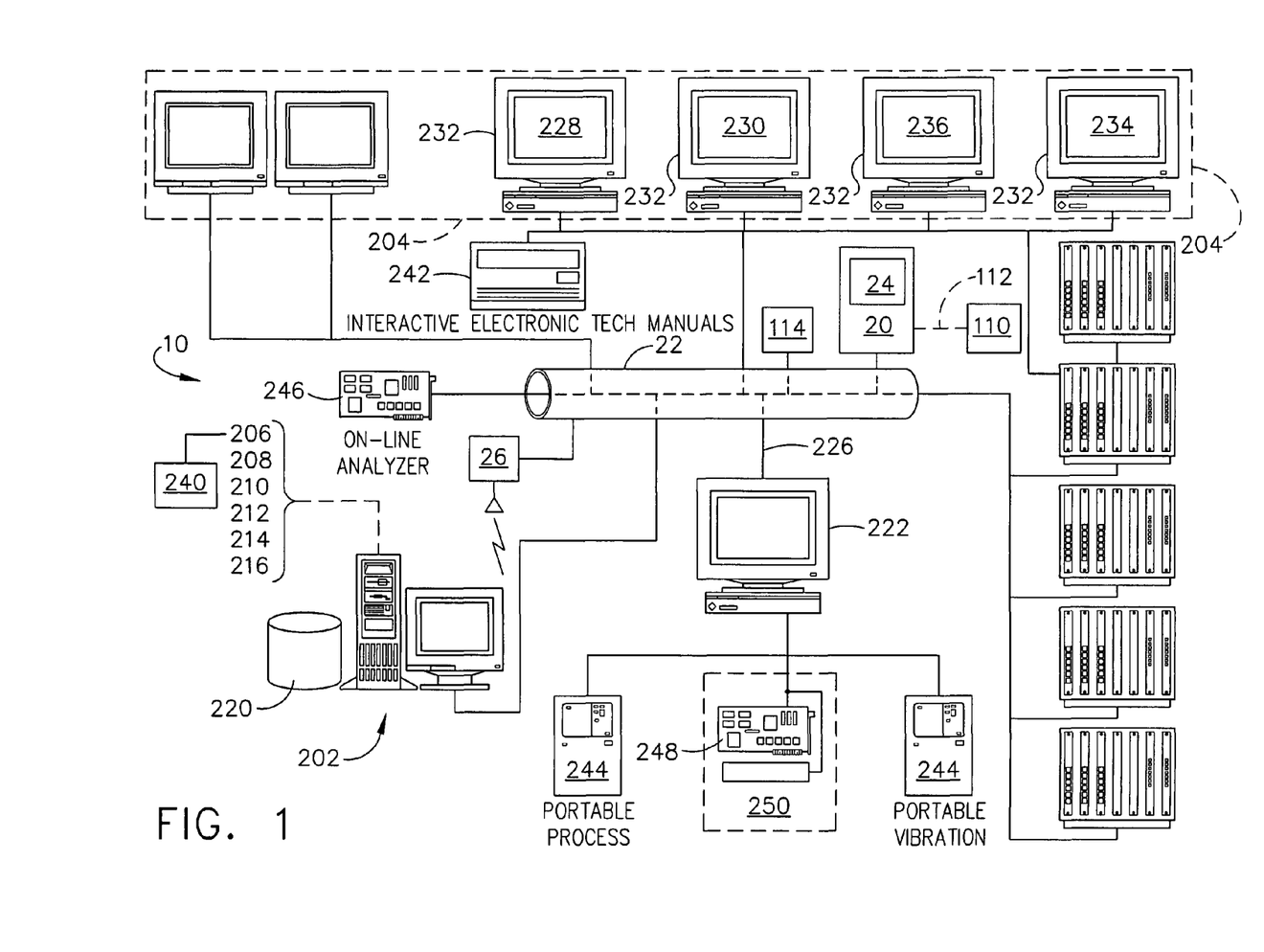
FIG. 1 is a block diagram of an exemplary embodiment of a network architecture of an industrial plant distributed control system (DCS)

FIG. 1 is a block diagram of an exemplary embodiment of a network architecture 10 of an industrial plant monitoring and control system, such as a distributed control system (DCS) 20. The industrial plant may include a plurality of plant equipment, such as pumps, motors, fans, and process monitoring sensors that are coupled in flow communication through interconnecting piping, and coupled in signal communication with DCS 20 through one or more remote input/ output (I/O) modules and interconnecting cabling and/or wireless communication. In the exemplary embodiment, the industrial plant includes DCS 20 including a network backbone 22. Network backbone 22 may be a hardwired data communication path fabricated from twisted pair cable, shielded coaxial cable or fiber optic cable, for example, or may be at least partially wireless. DCS 20 may also include a processor 24 that is communicatively coupled to the plant equipment, located at the industrial plant site or at remote locations, through network backbone 22. It is to be understood that any number of machines may be operatively connected to network backbone 22. A portion of the machines may be hardwired to network backbone 22, and another portion of the machines may be wirelessly coupled to backbone 22 via a base station 26 that is communicatively coupled to DCS 20. Wireless base station 26 may be used to expand the effective communication range of DCS 20, such as with equipment or sensors located remotely from the industrial plant but, still interconnected to one or more systems within the industrial plant.

DCS 20 may be configured to receive and display operational parameters associated with a plurality of equipment, and to generate automatic control signals and receive manual control inputs for controlling the operation of the equipment of industrial plant. In the exemplary embodiment, DCS 20 may include a software code segment configured to control processor 24 to analyze data received at DCS 20 that allows for on-line monitoring and diagnosis of the industrial plant machines. Data may be collected from each machine, including pumps and motors, associated process sensors, and local environmental sensors including, for example, vibration, seismic, ambient temperature and ambient humidity sensors. The data may be pre-processed by a local diagnostic module or a remote input/output module, or may transmitted to DCS 20 in raw form.

DCS 20 may operate independently to control the industrial plant, or may be communicatively coupled to one or more other control systems 110. Each control system 110 may communicate with each other and DCS 20 through a network segment 112, or may communicate through a network topology, for example, a star (not shown).

A continuous integrated machinery monitoring system (CIMMS) 114 may be a separate add-on hardware device, such as, for example, a personal computer (PC), that communicates with DCS 20 and other control systems 110 through network backbone 22. CIMMS 114 may also be embodied in a software program segment executing on DCS 20 and/or one or more of the other control systems 110. Accordingly, CIMMS 114 may operate in a distributed manner, such that a portion of the software program segment executes on several processors concurrently. As such, CIMMS 114 may be fully integrated into the operation of DCS 20 and other control systems 110. CIMMS 114 analyzes data received by DCS 20 and the other control systems 110 determine a health the machines and/or a process employing the machines using a global view of the industrial plant.

In the exemplary embodiment, network architecture 10 includes a server system 202 and one or more client systems 204. Server system 202 further includes a database server 206, an application server 208, a web server 210 a fax server 212, a directory server 214, and a mail server 216. Each of servers 206, 208, 210, 212, 214, and 216 may be embodied in software executing on server system 202, or any combinations of servers 206, 208, 210, 212, 214, and 216 may be embodied alone or in combination on separate server systems coupled in a local area network (LAN) (not shown). A disk storage unit 220 is coupled to server system 202. In addition, a workstation 222, such as a system administrator's workstation, a user workstation, and/or a supervisor's workstation are coupled to network backbone 22. Alternatively, workstations 222 are coupled to network backbone 22 using an Internet link 226 or are connected through a wireless connection.

Each workstation 222 may be a personal computer having a web browser. Although the functions performed at the workstations typically are illustrated as being performed at respective workstations 222, such functions can be performed at one of many personal computers coupled to network backbone 22. Workstations 222 are described as being associated with separate exemplary functions only to facilitate an understanding of the different types of functions that can be performed by individuals having access to network backbone 22.

Server system 202 is configured to be communicatively coupled to various individuals, including employees 228 and to third parties, e.g., service providers 230. The communication in the exemplary embodiment is illustrated as being performed using the Internet, however, any other wide area network (WAN) type communication can be utilized in other embodiments, i.e., the systems and processes are not limited to being practiced using the Internet.

In the exemplary embodiment, any authorized individual having a workstation 232 can access CIMMS 114. At least one of the client systems may include a manager workstation 234 located at a remote location. Workstations 222 may be embodied on personal computers having a web browser. Also, workstations 222 are configured to communicate with server system 202. Furthermore, fax server 212 communicates with remotely located client systems, including a client system 236 using a telephone link (not shown). Fax server 212 is configured to communicate with other client systems 228, 230, and 234, as well.

Computerized modeling and analysis tools of CIMMS 114, as described below in more detail, may be stored in server 202 and can be accessed by a requester at any one of client systems 204. In one embodiment, client systems 204 are computers including a web browser, such that server system 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment. Database server 206 is connected to a database 240 containing information about industrial plant 10, as described below in greater detail. In one embodiment, centralized database 240 is stored on server system 202 and can be accessed by potential users at one of client systems 204 by logging onto server system 202 through one of client systems 204. In an alternative embodiment, database 240 is stored remotely from server system 202 and may be non-centralized.

Other industrial plant systems may provide data that is accessible to server system 202 and/or client systems 204 through independent connections to network backbone 22. An interactive electronic tech manual server 242 services requests for machine data relating to a configuration of each machine. Such data may include operational capabilities, such as pump curves, motor horsepower rating, insulation class, and frame size, design parameters, such as dimensions, number of rotor bars or impeller blades, and machinery maintenance history, such as field alterations to the machine, as-found and as-left alignment measurements, and repairs implemented on the machine that do not return the machine to its original design condition.

A portable vibration monitor 244 may be intermittently coupled to LAN directly or through a computer input port such as ports included in workstations 222 or client systems 204. Typically, vibration data is collected in a route, collecting data from a predetermined list of machines on a periodic basis, for example, monthly or other periodicity. Vibration data may also be collected in conjunction with troubleshooting, maintenance, and commissioning activities. Such data may provide a new baseline for algorithms of CIMMS 114. Process data may similarly, be collected on a route basis or during troubleshooting, maintenance, and commissioning activities. Certain process parameters may not be permanently instrumented and a portable process data collector 244 may be used to collect process parameter data that can be downloaded to DCS 20 through workstation 222 so that it is accessible to CIMMS 114. Other process parameter data, such as process fluid chemistry analyzers and pollution emission analyzers may be provided to DCS 20 through a plurality of on-line monitors 246.

Electrical power supplied to various machines or generated by generated by generators with the industrial plant may be monitored by a motor protection relay 246 associated with each machine. Typically, such relays 246 are located remotely from the monitored equipment in a motor control center (MCC) or in switchgear 250 supplying the machine. In addition, to protection relays 246, switchgear 250 may also include a supervisory control and data acquisition system (SCADA) that provides CIMMS 114 with power supply or power delivery system (not shown) equipment located at the industrial plant, for example, in a switchyard, or remote transmission line breakers and line parameters.

Figure 2:
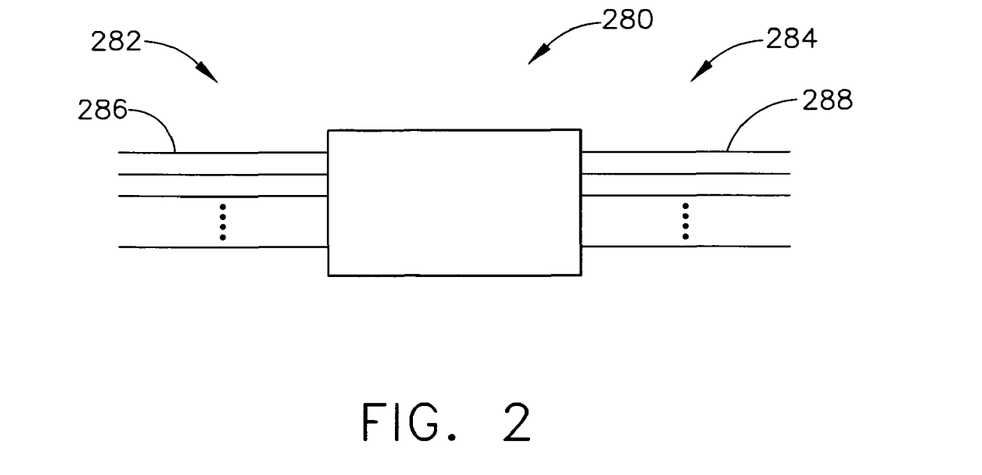
FIG. 2 is a block diagram of an exemplary rule set that may be used with the continuous integrated machinery monitoring system (CIMMS) shown in FIG. 1.

FIG. 2 is a block diagram of an exemplary rule set 280 that may be used with CIMMS 114 (shown in FIG. 1). Rule set 280 may be a combination of one or more custom rules, and a series of properties that define the behavior and state of the custom rules. The rules and properties may be bundled and stored in a format of an XML string, which may be encrypted based on a 25 character alphanumeric key when stored to a file. Rule set 280 is a modular knowledge cell that includes one or more inputs 282 and one or more outputs 284. Inputs 282 may be software ports that direct data from specific locations in CIMMS 114 to rule set 280. For example, an input from a pump outboard vibration sensor may be transmitted to a hardware input termination in DCS 20. DCS 20 may sample the signal at that termination to receive the signal thereon. The signal may then be processed and stored at a location in a memory accessible and/or integral to DCS 20. A first input 286 of rule set 280 may be mapped to the location in memory such that the contents of the location in memory is available to rule set 280 as an input. Similarly, an output 288 may be mapped to another location in the memory accessible to DCS 20 or to another memory such that the location in memory contains the output 288 of rule set 280.

In the exemplary embodiment, rule set 280 includes one or more rules relating to monitoring and diagnosis of specific problems associated with equipment operating in an industrial plant, such as, for example, a power plant, a refinery, and a chemical processing facility. Although rule set 280 is described in terms of being used with an industrial plant, rule set 280 may be appropriately constructed to capture any knowledge and be used for determining solutions in any field. For example, rule set 280 may contain knowledge pertaining to economic behavior, financial activity, weather phenomenon, design processes, and medical conditions. Rule set 280 may then be used to determine solutions to problems in these fields. Rule set 280 includes knowledge from one or many sources, such that the knowledge is transmitted to any system where rule set 280 is applied. Knowledge is captured in the form of rules that relate outputs 284 to inputs 282 such that a specification of inputs 282 and outputs 284 allows rule set 280 to be applied to CIMMS 114. Rule set 280 may include only rules specific to a specific plant asset and may be directed to only one possible problem associated with that specific plant asset. For example, rule set 280 may include only rules that are applicable to a motor or a motor/pump combination. Rule set 280 may only include rules that determine a health of the motor/pump combination using vibration data. Rule set 280 may also include rules that determine the health of the motor/pump combination using a suite of diagnostic tools that include, in addition to vibration analysis techniques, but may also include, for example, performance calculational tools and/or financial calculational tools for the motor/pump combination.

In operation, rule set 280 is created in a software developmental tool that prompts a user for relationships between inputs 282 and outputs 284. Inputs 282 may receive data representing, for example digital signals, analog signals, waveforms, manually entered and/or configuration parameters, and outputs from other rule sets. Rules within rule set 280 may include logical rules, numerical algorithms, application of waveform and signal processing techniques, expert system and artificial intelligence algorithms, statistical tools, and any other expression that may relate outputs 284 to inputs 282. Outputs 284 may be mapped to respective locations in the memory that are reserved and configured to receive each output 284. CIMMS 114 and DCS 20 may then use the locations in memory to accomplish any monitoring and/or control functions CIMMS 114 and DCS 20 may be programmed to perform. The rules of rule set 280 operate independently of CIMMS 114 and DCS 20, although inputs 282 may be supplied to rule set 280 and outputs 284 may be supplied to rule set 280, directly or indirectly through intervening devices.

Figure 3:
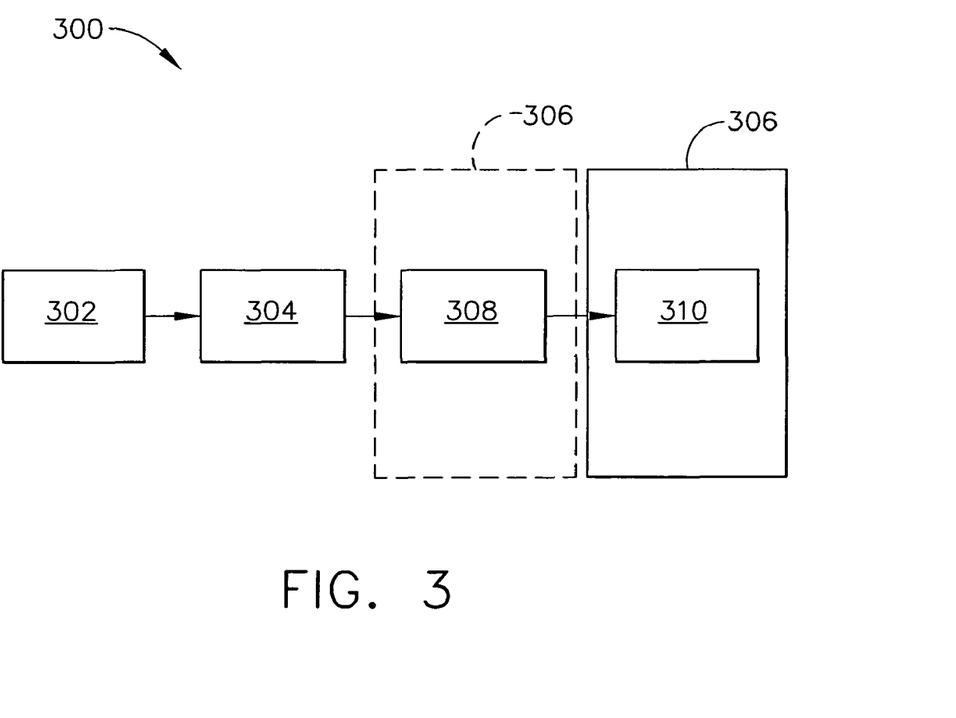
FIG. 3 illustrates an exemplary flow diagram of a life cycle of the rule set shown in FIG. 2.

FIG. 3 illustrates an exemplary flow diagram 300 of a life cycle of rule set 280 (shown in FIG. 2). During creation of rule set 280, in a developmental mode 302, a human expert in the field wherein rule set 280 is created, divulges knowledge of the field particular to a specific asset using the development tool by authoring one or more rules. The rules are created by creating expressions of relationship between outputs 284 and inputs 282 such that no coding of the rules is needed. Operands may be selected from a library of operands, using graphical methods, for example, using drag and drop on a graphical user interface built into the development tool. A graphical representation of an operand may be selected from a library portion of a screen display (not shown) and dragged and dropped into a rule creation portion. Relationships between input 282 and operands are arranged in a logical display fashion and the user is prompted for values, such as, constants, when appropriate based on specific operands and specific ones of inputs 282 that are selected. As many rules that are needed to capture the knowledge of the expert are created. Accordingly, rule set 280 may include a robust set of diagnostic and/or monitoring rules or a relatively less robust set of diagnostic and/or monitoring rules based on a customers requirements and a state of the art in the particular field of rule set 280. The development tool provides resources for testing rule set 280 during a test mode 304 of the development to ensure various combinations and values of inputs 282 produce expected outputs at outputs 284. To protect the knowledge or intellectual property captured in rule set 280, a developmental encryption code may be used to lock rule set 280 from being altered except by those in possession of the encryption key. For example, the creator of rule set 280 may keep the encryption key to lockout end users of rule set 280, the creator may sell the encryption key or license it for a period of time, to the end user or third parties, who may then provides services to the end user.

After development, rule set 280 may enter a distribution mode wherein rule set 280 is converted to a transmittable form, for example, a XML file that may be transmitted to a customer via e-mail, CD-ROM, link to an Internet site, or any other means for transmission of a computer readable file. Rule set 280 may be encrypted with a distribution encryption code that may prevent the use of rule set 280 unless the end user is authorized by the creator, for example, by purchasing a distribution encryption key. Rule set 280 may be received by an end user through any means by which a computer readable file may be transmitted. A rule set manager 306, which may be a software platform that forms a portion of CIMMS 114, may receive the distributable form of rule set 280 and convert it to a format usable by CIMMS 114. Rule set manager 306 may be a graphical user interface that allows an end user to manipulate one or more rule sets 280 as objects. Rule set manager 306 may be used to apply rule set 280 such that inputs 282 and corresponding locations in memory are mapped correctly and outputs 284 and their corresponding locations in memory are mapped correctly. When initially applied, rule set 280 may be placed into a trial mode 308 wherein rule set 280 operates as created except that notifications of anomalous behavior may be detected by rule set 280 are not distributed or distributed on a limited basis. During trial mode 308, quality certifications may be performed to ensure rule set 280 operates correctly in an operating environment. When quality certification is complete, rule set 280 may be placed into a commission mode 310 wherein rule set 280 operates on CIMMS 114 with full functionality of the rules within rule set 280. In another embodiment, rule set 280 includes a life cycle with only two modes, a trial mode and a live mode. In the trial mode, rules run normally except there are no events generated nor notifications sent, and the live mode is substantially similar to commission mode 310.

Figure 4:
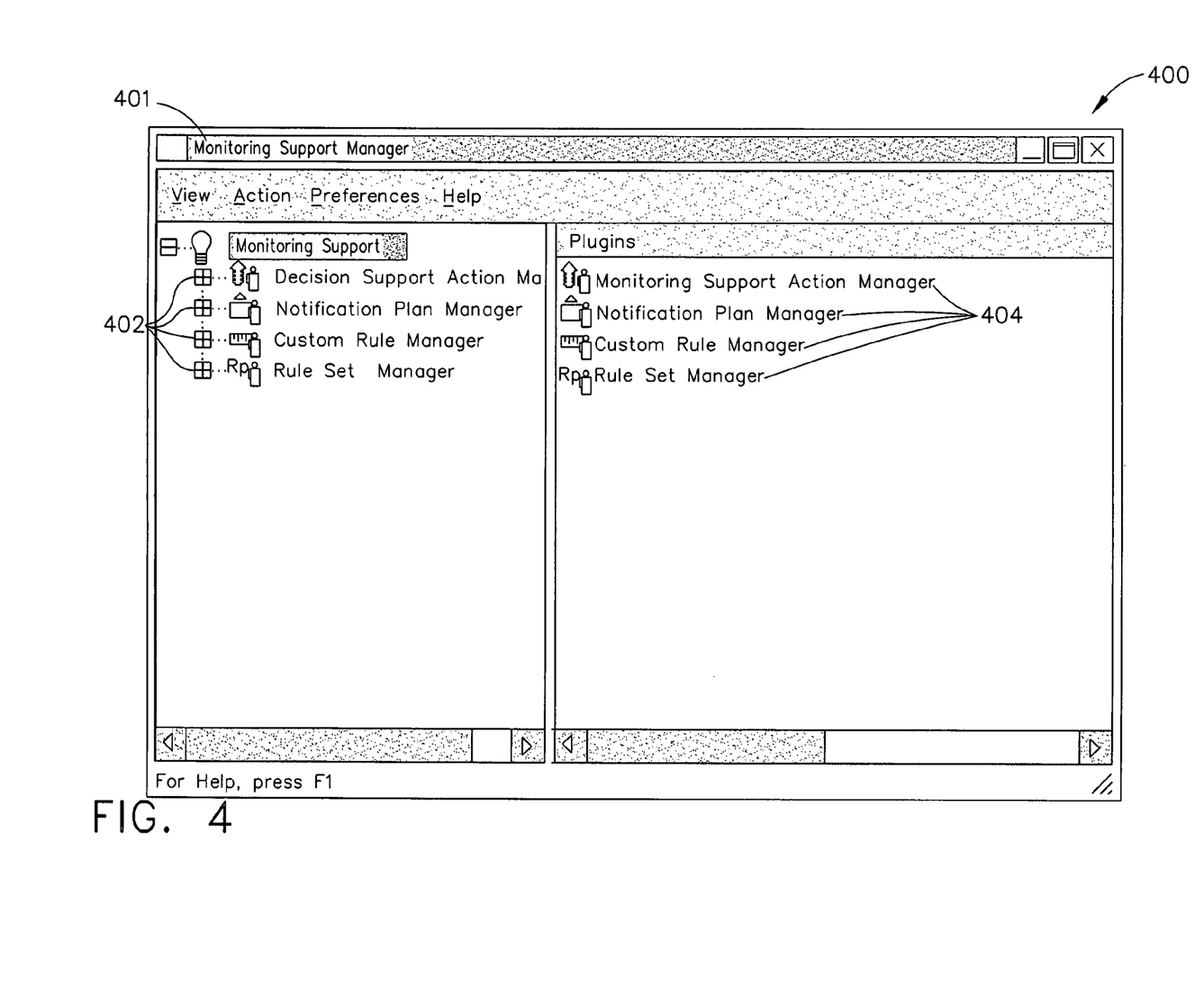
FIG. 4 is an example embodiment of a user interface displaying a tree view of a Monitoring Support Manager (MSM) entry screen.

FIG. 4 is an example embodiment of a user interface 400 displaying a tree view of a Monitoring Support Manager (MSM) 401 entry screen. A user may select execution of MSM 401 from a toolbar located on a display of the PC executing CIMMS 114 (shown in FIG. 1) using, for example, an icon, drop-down menu, a hot-key sequence, or other input that signals processor 24 to load MSM 401 into memory and begin executing MSM 401. The content management module of the MSM 401 entry page may be designed much similar to what a user experiences in Windows® Explorer—it uses a folder 402 and a file 404 structure environment (Windows is a registered trademark of Microsoft Corporation, Redmond, Wash.). Folders are containers for organizing files of various types such as rule sets 280, Microsoft Word, Excel, Power point, PDF, HTML, XML etc. Through content management using MSM 401, the end user can create folders, folders inside folders to organize rule sets 280 that are applied to equipment in the same plant system, the same plant location, of the same equipment type, or any other organization criteria the end user determines. Inside a folder, more folders, or files may be stored.

MSM 401 facilitates the usability of various monitoring support capabilities by providing a central location from which monitoring support tasks may be performed. Such tasks may include importing rule sets 280 into a rule set library, applying rule sets 280 to one or more assets within an enterprise, for example a company with multiple sites, removing rule sets 280 from assets, managing different versions of rule sets 280, updating rule sets, resolving operands for rules within applied rule sets 280, managing rule set life cycles, pre-commissioning testing of rules within rule sets 280, enforcing rule set security, creating and applying custom rules, creating/modifying action plans and actionable information text sets, creating/modifying notification plans, and creating/modifying custom condition types (event types).

Figure 5:
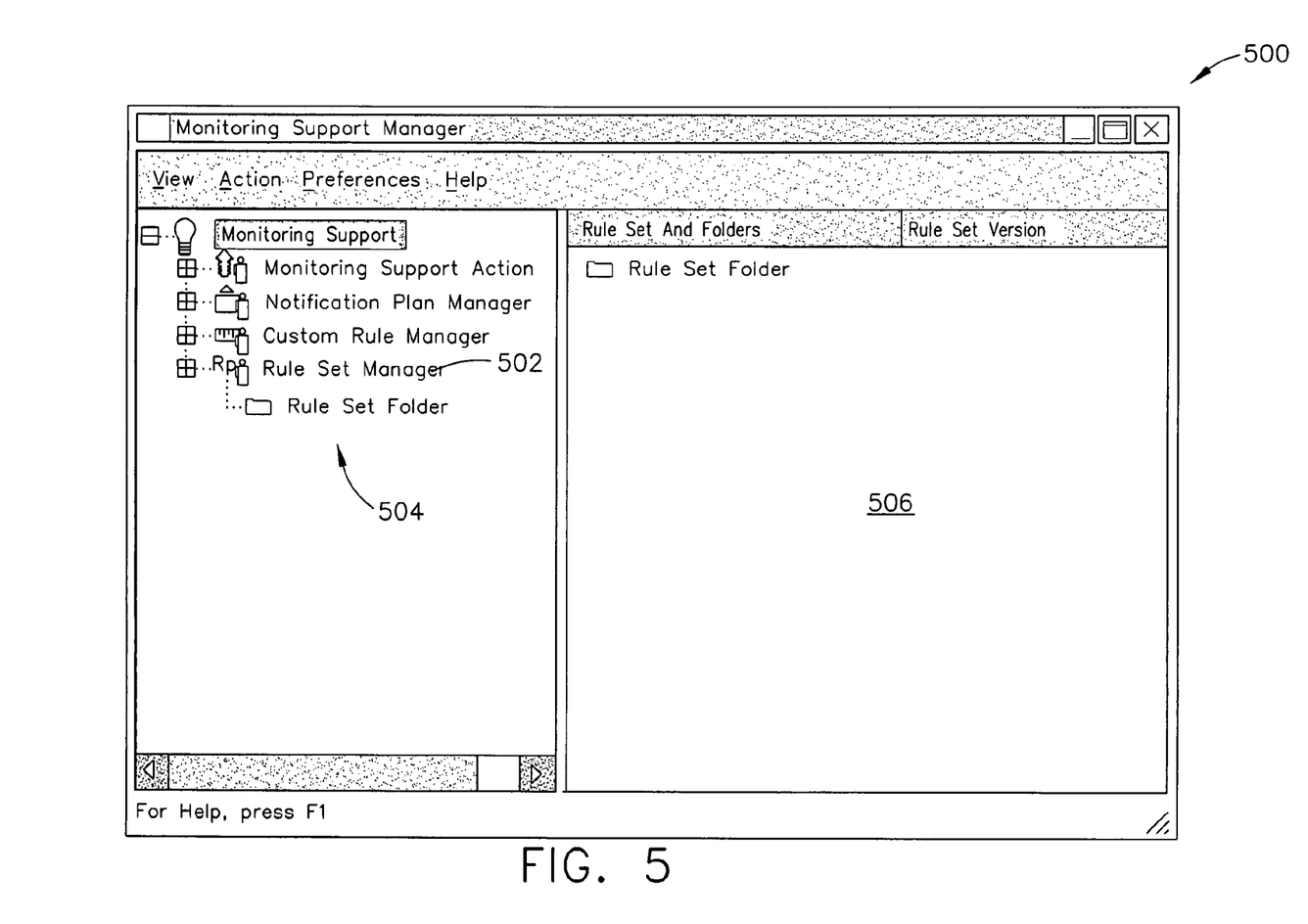
FIG. 5 is an illustration of exemplary embodiment of the user interface that may be displayed after selecting a Rule Set Manger folder in a folder list of the user interface.

FIG. 5 is an illustration of exemplary embodiment of user interface 500 that may be displayed after selecting a Rule Set Manger folder 502 in a folder list 504. When selected, a rule set manger application allows import of rule sets 280 and application of rule set templates (not shown) to plant assets. Rule set manger facilitates managing importing rule set templates. Rule Set Manger folder 502 represents a node in the tree view of folder list 504. Sub-folders of Rule Set Manger folder 502 may be displayed in folder list 504 if the node, Rule Set Manger folder 502 is expanded and may be not displayed or hidden if Rule Set Manger folder 502 is collapsed. Folders and files that are subordinate or contained within Rule Set Manger folder 502 may be displayed in a Rule Set and Folders portion 506 of user interface 300. Children of each level of folders may be displayed by selecting the parent and/or expanding folder list 504.

A rule set importer application is a wizard-based process for finding and adding rule sets to the enterprise and contains a browse window to locate rule set files. If an encryption key is required, a window may be displayed requiring the user to enter the encryption key before rule set 280 may be imported. The encryption key may be auto-generated at the time the rule set was exported and may be copied/pasted when the key is generated. The rule set importer also may interpret the rule pack file. The rule set importer enters rule set information into the enterprise database and may initiate MSM to refresh the list of rule sets.

A rule set library manager is an application module that may list the rule set library details that are loaded when the rule set library node is selected in the tree view, display a list of all rule sets that have been imported, and display a name of each rule set 280, an asset type to which rule set 280 applies, and a version of rule set 280.

A rule set manager may display a list of versions of rule set 280 that are loaded when a rule set 280 node is selected in the tree view. The rule set manager checks if the imported rule set already exists on the enterprise and displays predetermined messages based on the version of imported rule set 280. If the imported rule set is a different version than the existing rule set 280, all assets using this rule set 280 may be updated. A selected rule set version may be deleted.

A rule set version manager may display a list of rule set 280 version details that are loaded when rule set 280 version node is selected in the tree view and displays information about the selected rule set node.

A rule set application wizard manages a three part rule set application process, asset selection, rule set general properties, and operand mapping. An asset may be selected from an enterprise hierarchy using a hierarchy view which, allows the user to drill down to a selected asset in the hierarchy. A rule set may be applied to the selected asset and made active, and its name and/or tag name may be changed. An operand mapping dialog may include a tree style list of at least a portion of all operands in rule set 280. Each operand in the list may include the rule name, operand description, measurement type, relative component path, and operand status. The measurement type and relative component path may be "Unknown". If they are "Unknown" the text may be displayed in a red color. The operand status may be "Unresolved", this text also may be displayed in a red color. Each rule set may provide the ability to configure a list of users each with a set of privileges. The set of privileges may include, for example, Rule Set Administrator (All privileges), Map Operands, and Apply Rule Sets. These privileges may apply throughout MSM when performing actions on rule sets or other rules. MSM may block an action view, if the current user does not have the requisite privileges.

Figure 6:
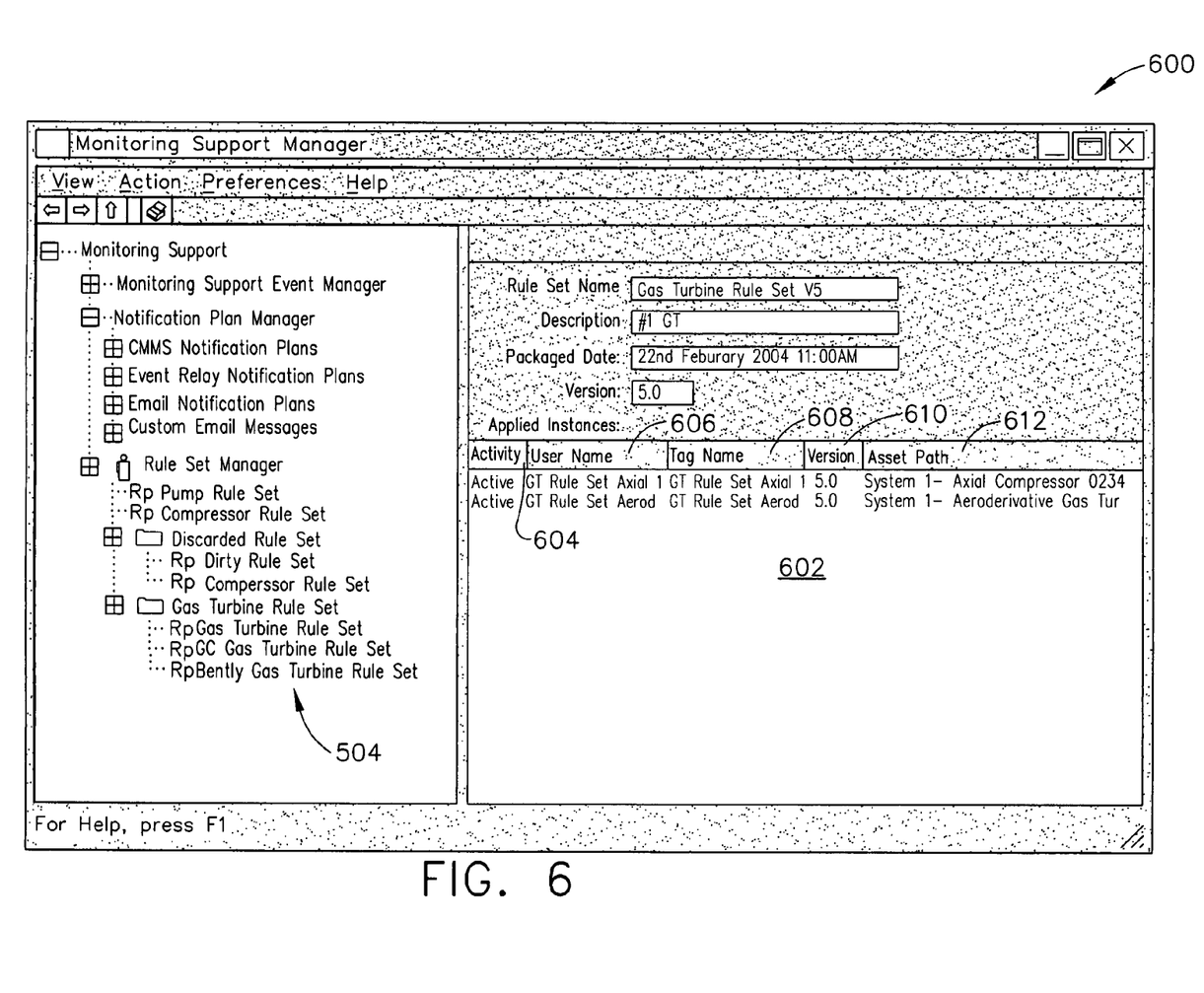
FIG. 6 is an illustration of an exemplary embodiment of the user interface that may be displayed to a user through folders contained within the Rule Set Manger folder.

FIG. 6 is an illustration of an exemplary embodiment of user interface 600 that may be displayed to an user after drilling down through folders contained within Rule Set Manger folder 502. Folder list 540 displays tree nodes of various folders that may be configured to display and organize a plurality of rule sets 280. Using MSM 401 any number of folders and subfolders may be created and organized in a logical fashion related to the user's facility. When a rule set 280 is selected in folder list 504, details of the selected select set 280 is displayed in a rule set property display 602 that includes information reading each rule set 280. For example, in the exemplary embodiment, rule set property display 602 includes, in columnar form, fields for rule set activity 604, a rule set user name 606, a rule set tag name 608, a rule set version 610, and a rule set asset path 612. In an alternative embodiment, rule set property display 602 may be configured to show more or less rule set properties.

A technical effect of the present invention is to capture expert knowledge in a form that can be created and modified without software coding by an application expert. The knowledge may captured in the form of rules that relate the outputs of the set of software rules to the inputs of the set of software rules. The rule set may then be encrypted such that only a possessor of the encryption key may import the rule set. In operation, the rule set acts as a black box that receives data input and transmits data output that is related to the inputs by the knowledge rules created in the rule set. The rule set may be converted to a form that is easily transmittable, over a data network or computer readable media, to a customer or other user, such as an authorized third party services provider.

While the present invention is described with reference to an industrial plant, numerous other applications are contemplated. It is contemplated that the present invention may be applied to any control system, including facilities, such as commercial facilities, vehicles, for example ships, aircraft, and trains, and office buildings or a campus of buildings, as well as, refineries and midstream liquids facilities, and facilities that produce discrete product outputs, such as, factories.

The above-described systems and methods of capturing knowledge in a modular, transmittable, prosecutable form is cost-effective and highly reliable for monitoring and managing the operation and maintenance of facilities. More specifically, the methods and systems described herein facilitate determining facility machine health. As a result, the methods and systems described herein facilitate reducing plant operating costs in a cost-effective and reliable manner.

Exemplary embodiments of real-time equipment monitoring systems and methods are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of managing a machinery monitoring system including a database of at least one rule set, the rule set including at least one rule expressed as a relational expression of a real-time data output relative to a real-time data input, the relational expression being specific to a plant asset, said method comprising:

configuring a list of users that are authorized to access a rule set;

importing, by said authorized end user, data representative of the rule set into the machinery monitoring system, the data including full operand relative path information;

applying the at least one rule set to a specific plant asset that is monitored by a plant monitoring and control system wherein the at least one rule set is configured to locate the data input using at least a portion of the full operand relative path information;

determining a data output of the at least one rule set using the at least one relational expression and the data input;

transmitting the data output to at least one of the machinery monitoring system and the plant monitoring and control system; and determining, by the at least one of the machinery monitoring system and the plant monitoring and control system, a health of the plant asset based on the data output.

2. A method in accordance with claim 1 further comprising executing at least one of an event type and an actionable information text set.

3. A method in accordance with claim 1 wherein importing data representative of a rule set comprises receiving the rule set as an Extended Mark-up Language (XML) file.

4. A method in accordance with claim 1 wherein importing data representative of a rule set comprises receiving the rule set via at least one of an e-mail and a CD-ROM.

5. A method in accordance with claim 1 wherein importing data representative of a rule set comprises importing the rule set into a rule set library.

6. A method in accordance with claim 1 wherein the plant monitoring and control system is one of a plurality of plant monitoring and control systems operated by a business enterprise, said importing data representative of a rule set comprises:

creating a base rule set based on a specific plant asset type;

editing the base rule set to create a plant asset specific rule set; and transmitting the rule set to the machinery monitoring system.

7. A method in accordance with claim 6 wherein importing data representative of a rule set further comprises testing the plant asset specific rule set using at least one of plant asset design data, plant asset maintenance history, plant asset offline analysis, and empirical testing.

8. A method in accordance with claim 6 wherein editing the base rule set to create a plant asset specific rule set comprises:

selecting a condition to be detected, the condition being detectable using parameters monitored by the plant monitoring and control system;

creating a relative path to the parameters;

selecting operands to process the parameters; and creating relative path to the output data.

9. A method in accordance with claim 1 wherein applying the rule set to a specific plant asset comprises resolving the operands for at least one rule in the rule set.

10. A method in accordance with claim 8 further comprising:
  creating a conditionally executable at least one of an event type and an actionable information text set using the selected operands; and
  appending the created at least one of an event type and an actionable information text set to the rule set.

11. A method in accordance with claim 1 wherein the plant monitoring and control system is one of a plurality of plant monitoring and control systems operated by a business enterprise, said importing the rule set into the server system comprises:
  selecting a rule set from at least one rule set applied to at least one of the plurality of plant monitoring and control systems; and
  transmitting the selected rule set from the at least one of the plurality of business enterprise plant monitoring and control systems to the plant monitoring and control system.

12. A method in accordance with claim 11 further comprising editing a rule set by the business enterprise user after the rule set is applied on the plant monitoring and control system.

* * * * *